T. OMDAL.
COMBINED CLUTCH AND REVERSING GEAR.
APPLICATION FILED AUG. 12, 1918. RENEWED APR. 15, 1922.

1,435,021.

Patented Nov. 7, 1922.

INVENTOR
Torgeir Omdal
BY
Townsend & Decker
ATTORNEYS

T. OMDAL.
COMBINED CLUTCH AND REVERSING GEAR.
APPLICATION FILED AUG. 12, 1918. RENEWED APR. 15, 1922.

1,435,021.

Patented Nov. 7, 1922.
6 SHEETS—SHEET 4.

INVENTOR
Torgeir Omdal
BY
Townsend & Decker
ATTORNEYS

T. OMDAL.
COMBINED CLUTCH AND REVERSING GEAR.
APPLICATION FILED AUG. 12, 1918. RENEWED APR. 15, 1922.
1,435,021.
Patented Nov. 7, 1922.
6 SHEETS—SHEET 5.
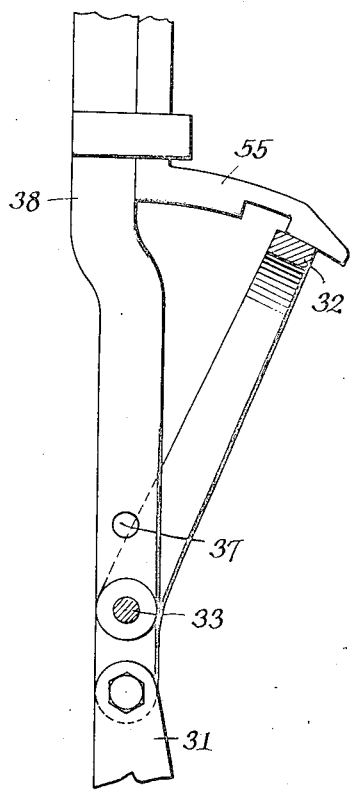
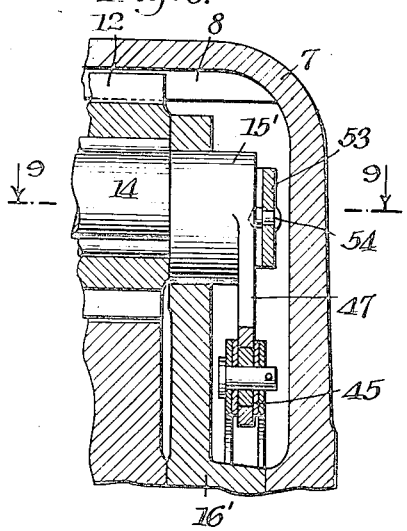
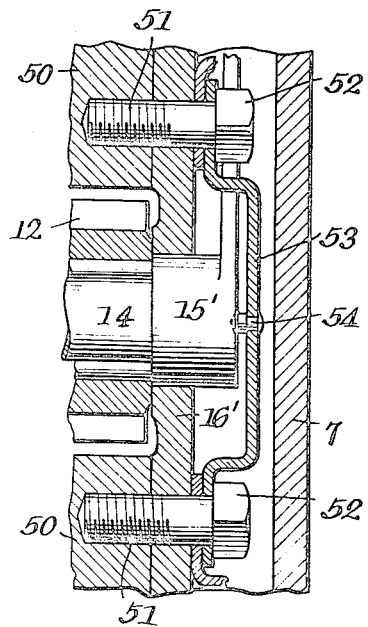

T. OMDAL.
COMBINED CLUTCH AND REVERSING GEAR.
APPLICATION FILED AUG. 12, 1918. RENEWED APR. 15, 1922.

1,435,021.

Patented Nov. 7, 1922.
6 SHEETS—SHEET 6.

INVENTOR
Torgeir Omdal
BY
Townsend & Decker
ATTORNEYS

Patented Nov. 7, 1922.

1,435,021

UNITED STATES PATENT OFFICE.

TORGEIR OMDAL, OF BROOKLYN, NEW YORK.

COMBINED CLUTCH AND REVERSING GEAR.

Application filed August 12, 1918, Serial No. 249,374. Renewed April 15, 1922. Serial No. 553,071.

*To all whom it may concern:*

Be it known that I, TORGEIR OMDAL, a citizen of the United States, and a resident of Brooklyn, in the county of Kings and State of New York, have invented certain new and useful Improvements in Combined Clutch and Reversing Gear, of which the following is a specification.

My invention relates to a combined clutch and reversing gear especially adapted for use in marine propulsion although the improvements forming the special features of the invention are applicable to other uses.

One of the objects of my invention is to provide an automatic positive self-adjustment of the clutch so as to eliminate the effects of wear and thus prevent slip, and to secure this effect both for forward and reverse drive.

A further object is to automatically increase the friction of the clutch with increase of load.

Another object of my invention is to so construct the clutch and reversing gear that it can also be set to permit slipping in case the driven device meets an obstruction as for instance in the case of a marine propeller striking some obstacle which would damage the same if the propeller were driven through a rigid drive.

Another object is to provide a gearing useful in transmitting heavy power by distributing the power through a number of drive gears and equalizing the distribution of the load or torque in said gears automatically.

The latter object is accomplished by transmitting the power through a number of independently rotatable gears mounted and interconnected as to their mountings in the manner hereinafter described so that an increase of load or torque in one will move it in a way to decrease the proportion of torque therethrough and such movement will be communicated through interconnecting equalizing devices to the mountings of the others in a manner to increase the torque through the same.

With the above objects in view and with the purpose of accomplishing the objects by a plain, simple and compact construction, my invention consists in the features and details of construction of devices hereinafter more particularly described and then specified in the claims.

In the accompanying drawings Fig. 1 is a general vertical central section of a combined reversing gear and frictional clutch embodying my invention.

Fig. 7 shows in detail the control lever provided with a latch for co-operation with an actuating device employed to throw the lever back into neutral position at the time of disconnection of the power for either forward or backward drive.

Fig. 8 is an enlarged section of the construction at one end of the pinion.

Fig. 9 is an enlarged sectional view of a detail of the construction for holding the eccentrically mounted pinions in place in their carriers.

1 indicates a frame or base forming a base or mounting for the device and likewise a drip pan and housing for the lower portion of the same. 2 is the drive shaft of the device and 3 is a shaft connected to the engine or motive power and coupled with shaft 2 in any suitable way as for instance by a coupling the hubs 4, 4' of which are keyed to said shafts while the coupling flanges 5, 5' extending from said hubs are bolted together as shown.

Figure 1:
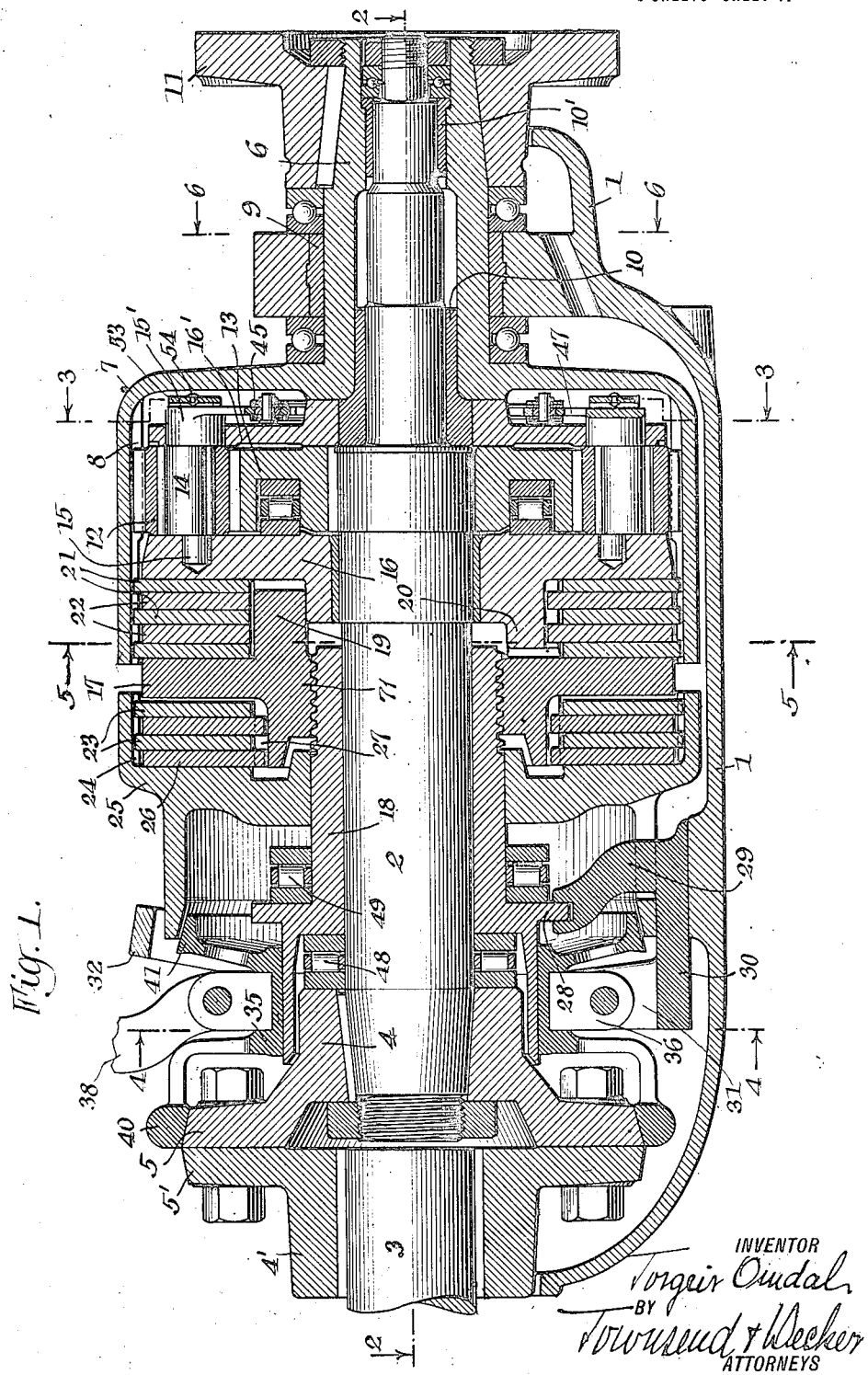
Figure 3:
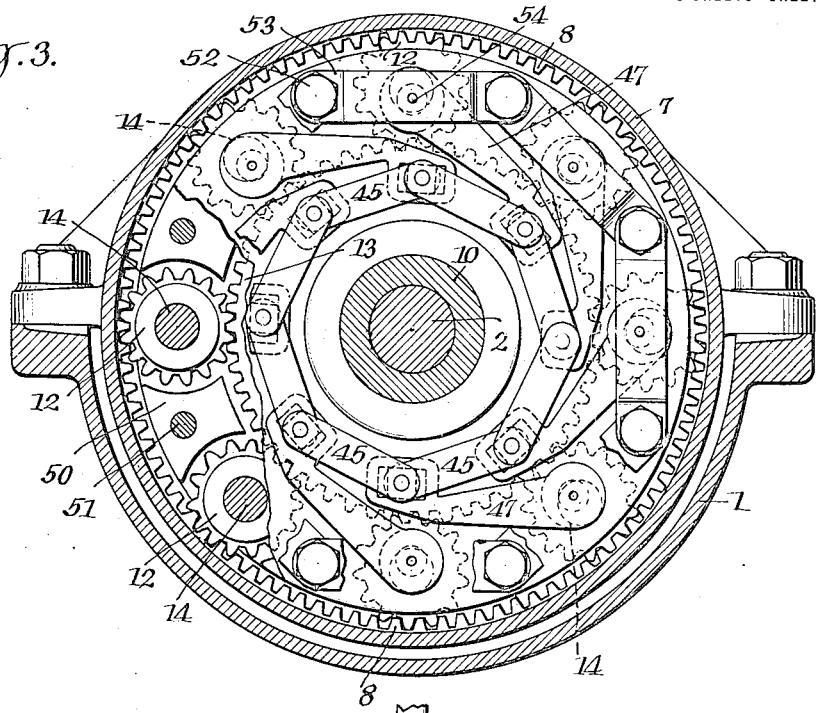
Fig. 3 is an elevation and vertical section on the line 3—3 Fig. 1 showing the manner of mounting and interconnecting the multiple gears to equalize the torque among them automatically.
Figure 4:
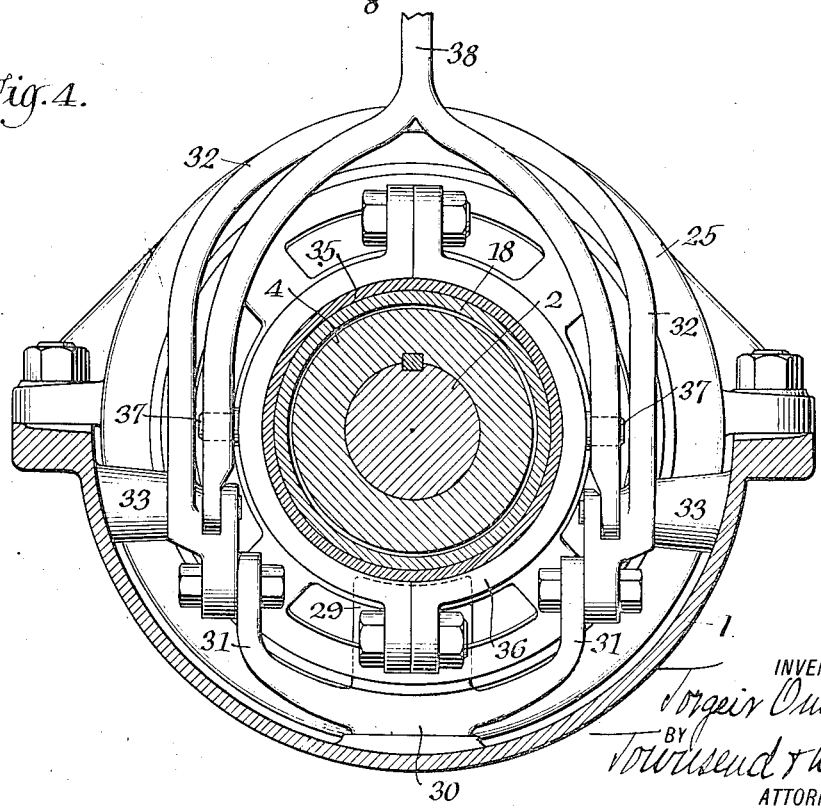
Fig. 4 is an elevation and vertical section on the line 4—4 Fig. 1 showing the manner of mounting the clutch and gear control levers.
Figure 5:
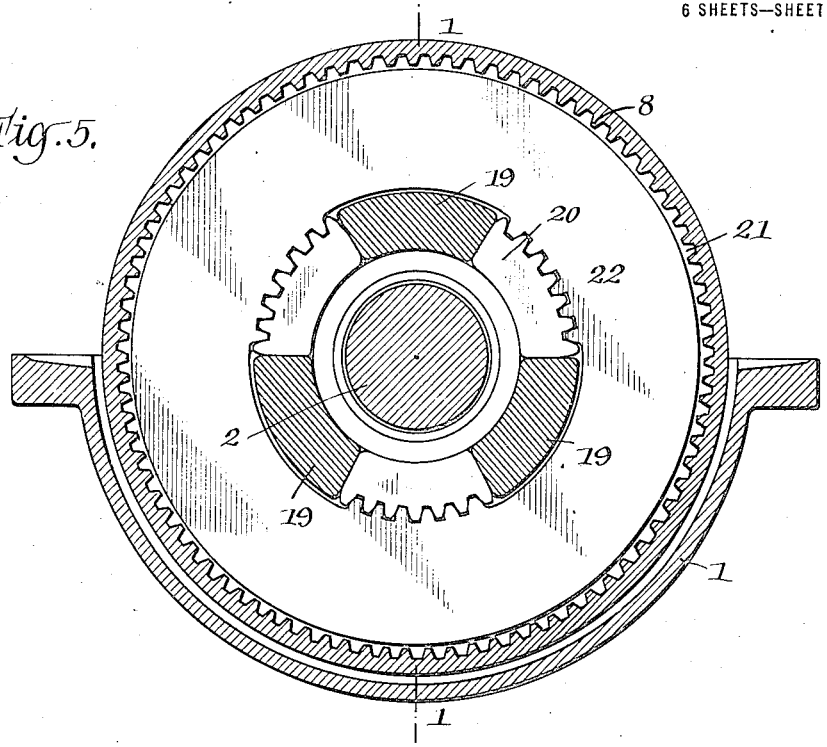
Fig. 5 is a vertical section on the line 5—5 Fig. 1.
Figure 6:
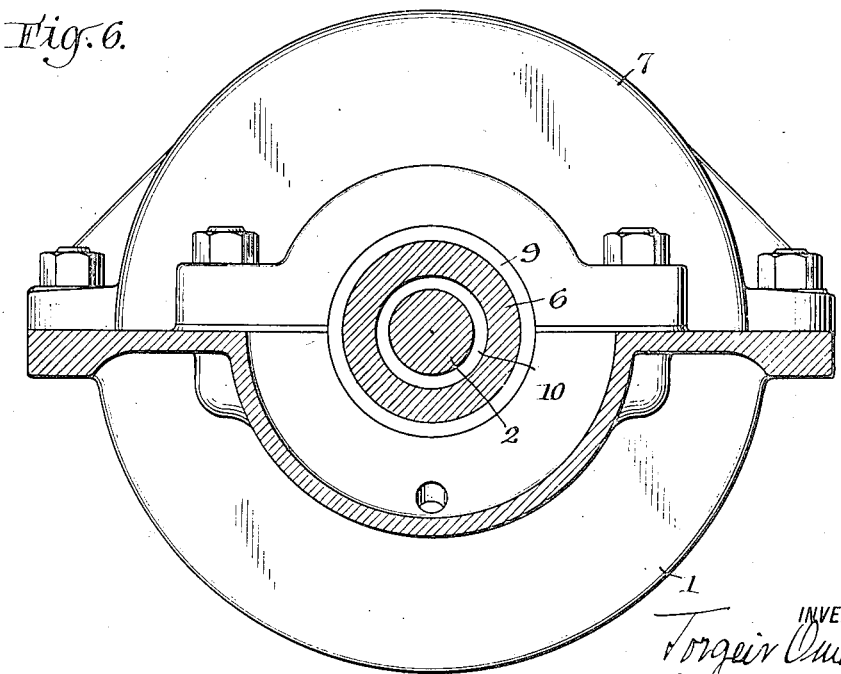
Fig. 6 is a vertical section on the line 6—6 Fig. 1.

The driven shaft of the device is indicated at 6. This shaft or element may be, and preferably is, as indicated, a hollow shaft concentric with and journalled upon the drive shaft 2 and frame or base. When it is desired to drive the shaft 6 from shaft 2 through a system of gearing of the character herein described, said driven shaft may have an internal gear 8 upon the inside of a barrel or housing 7 carried by the driven shaft 6 as shown in Figs. 1 and 3.

9 indicates an external journal bearing for the shaft 6 on the frame or base 1 while 10, 10' indicate bushings or bearings between the inside of the hollow driven shaft and the exterior of the drive shaft 2 upon which said drive and driven shafts may turn one upon or within the other.

11 is the flange of a coupling by which the driven shaft 6 may be coupled to the marine propeller or other load.

To provide a reverse drive of shaft 6 from shaft 2 as well as for other purposes which will be readily understood as the description proceeds, as well as to cause equalization of the load in the gears, the following construction may be employed.

12 indicates a series of drive gears meshing with gear 8 for driving the shaft 6 from shaft 2 by the action of a gear wheel or disc 13 keyed to said shaft 6 and meshing with said gears 12. Said gears 12 are mounted and turn upon pintles 14 the latter being supported as shown by shafts 15, 15' one of which is a stub shaft, or otherwise. Suitable roller bearings or bushings may be interposed as shown between the gears 12 and the pintles or mountings 14 upon which they turn. The shafts upon which the mountings or pintles of gears 12 are supported turn upon centers eccentric to the axes of rotation of the gears, thereby permitting said mountings to move under the influence of the driving torque when the drive is by rotation of the gears or pinions on their own axes, and in a direction to tend to relieve the torque on said pinions.

By a system of interconnection of said mountings however, and as will be presently described, the movement or tendency to movement of the mounting and attached gear in this manner produces a contrary movement in the others in a way to increase the torque or drive through the latter, and this action takes place in the same way for all said gears, so that there is a substantial equalization of the drive distributed through them despite any tendency that there might otherwise be for the torque or power to act through any one in preference to the others.

16, 16' indicate rotatable carriers upon which the gears or pinions are supported by means of their pintles. Said carriers are, for rotation, preferably sleeved on shaft 2 through suitable interposed bushings as indicated, permitting the shaft 2 and carriers to turn independently of one another. When the carriers are locked against rotation the drive from 2 to 6 will be by a gear reduction the ratio of which is determined by the relative size of the internal and external gears 13 and 8 and with a direction of rotation of 6 reverse to that of 2, while by locking 16 to 6 by means of a suitable clutch, preferably a friction clutch, to be now described, the drive may be a direct forward drive from the drive shaft 2 to 6 at synchronous speeds, the drive being then from 13 through the pinions, (which are now held from rotation on their own axes) the carrier 16, the clutch by which 16 is locked to barrel or housing 7, and to shaft 6, all of which now rotate bodily together with shaft 2 as one structure.

The locking of the pinion or gear carrier 16 to barrel 7 for forward rotation of driven shaft 6 and the locking of the same against rotation to drive the shaft 6 reversely is effected preferably by clutches having an actuating or compressing device or member 17 which is preferably arranged to surround the shaft 2 and is axially or longitudinally movable to tighten or release the clutch or clutches by a self-adjusting screw action forming an important feature of my invention and to be now described.

Figure 10:
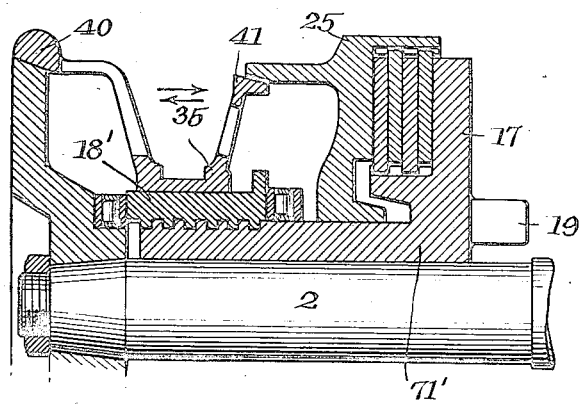
Fig. 10 shows a modification in the construction and mounting of the screw action employed for setting and releasing the clutch.

18 is a member rotatable on an axis preferably the same as the axis of the shaft 2 and provided with screw threads engaged by co-operating screw threads on the hub 71 carrying the clutch actuating member 17. In the particular embodiment of my invention shown the member 18 is a hollow stem or screw mounted as a sleeve loose on shaft 2 and having external screw threads and the member 71 has internal screw threads which engage with the member 18 after the manner of the nut on a bolt. This particular disposition of the screw threads of the co-acting parts 17 and 18 is not necessary, however, and as shown in Fig. 10, the member 17 might be supported on a sleeve 71' on the shaft 2 and said sleeve be provided with an external screw thread co-operating with an internal screw thread on a member 18' operated and controlled in the same way as member 18 to produce the same effects by relative rotation of the co-operating complementary threaded members of the screw action. The preferred construction, however, is the one shown in which the hub of the clutch actuating member 17 and member 18 bear the usual relation to one another of a screw threaded bolt and nut and said threaded member 18 is sleeved on the shaft 2.

Ordinarily and for the purpose of securing engagement and disengagement of the clutch for direct drive or the clutch for reverse drive, as may be desired, no axial movement of the member 18 or 18' on the shaft 2 is necessary, provision for axial movement thereof being made only when it is desired to secure the operation of a latch employed when the power is to be disconnected from the load by the means hereinafter described.

When the threaded member 18 is rotated, preferably by being coupled with the shaft 2 as will be presently described, and the hub carrying member 17 is stationary with relation to the shaft 2, or turns at a less rate than said shaft 2 and member 18, the clutch actuator 17 is moved axially in a direction to compress the members of a friction clutch consisting preferably of an annular disc clutch by which shafts 2 and 6 are coupled together, and shafts 2 and 6 rotate together for full speed forward rotation of the driven or propeller shaft. When the member 18 is held against rotation and the axially movable member 17 is rotated, a reverse operation of the screw action takes place and said member 17 is moved back axially or in a direction to release the clutch for direct drive and so as preferably to engage and compress the members of a friction clutch between itself and a fixed support. Reverse drive of the driven shaft through the gears 13, 12 and 8 then takes place.

To cause rotation of member 17 with respect to member 18 by the operation of the drive shaft and at the same time allow its free axial movement, member 16 may engage with and turn member 17 by suitable jaws like those of a jaw clutch, or by other suitable devices allowing axial movement of the nut independently of the means employed for turning it. As will be seen member 16 being sleeved on the shaft 2, rotation of the latter may continue after the locking of member 17 and connected member 16 against rotation has been effected.

Obviously the apparatus described might be employed simply for engaging the friction clutch members or releasing them for forward drive, and the fixed friction clutch omitted. It will be seen, however, that when said fixed clutch is employed and brought into action to stop the turning member 17, the member 16 being interlocked therewith by the jaw clutch, is itself locked against movement so as to produce the reverse drive described.

Figure 11:
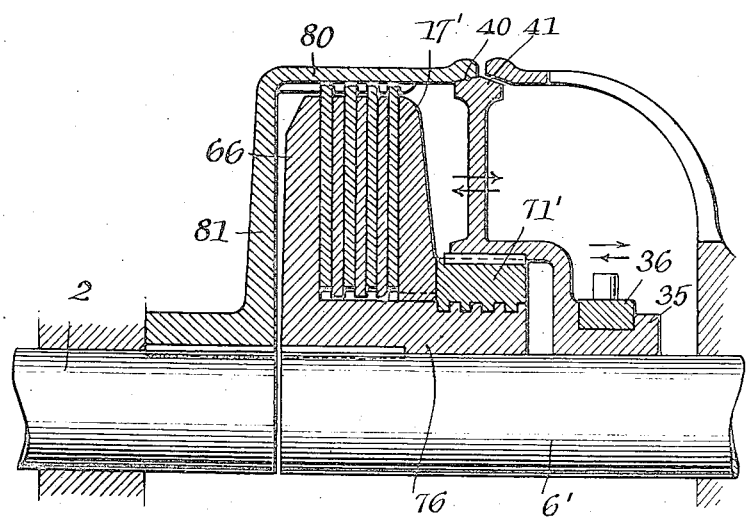
Fig. 11 shows in partial section a simplified form of the invention adapted for use in cases where it is desired to provide for connection and disconnection of the shafts for direct drive only.

In case my invention is employed for direct drive only, the use of the jaws 19 and cooperating disc 16 becomes unnecessary and the gear wheel and gears between the drive and driven shafts would be omitted. This modification is illustrated in Fig. 11 which will be described at the end of this specification.

19 indicates interlocking jaws upon the member 17 projecting axially therefrom into the spaces between co-operating interlocking jaws 20, projecting in the opposite direction from the member 16. As shown, a slight clearance space is left on the ends of said jaws to allow longitudinal or axial movement of compressing member or nut 17.

The friction clutches the members of which are compressed by the action of the member 17 and co-operating screw 18 may be of the multiple disc type or any other suitable type. As shown, the clutch for interlocking members 16 and 7 comprise discs 21 connected with the barrel or member 7 by feathers engaging notches in the outer edges of said discs, (said feathers being, if desired, continuations of the gear teeth 8) and other discs 22 alternating with the former and engaged with member 16 by means of feathers on the jaws 20 disposed in notches on the inner edges of said discs 22.

Figure 2:
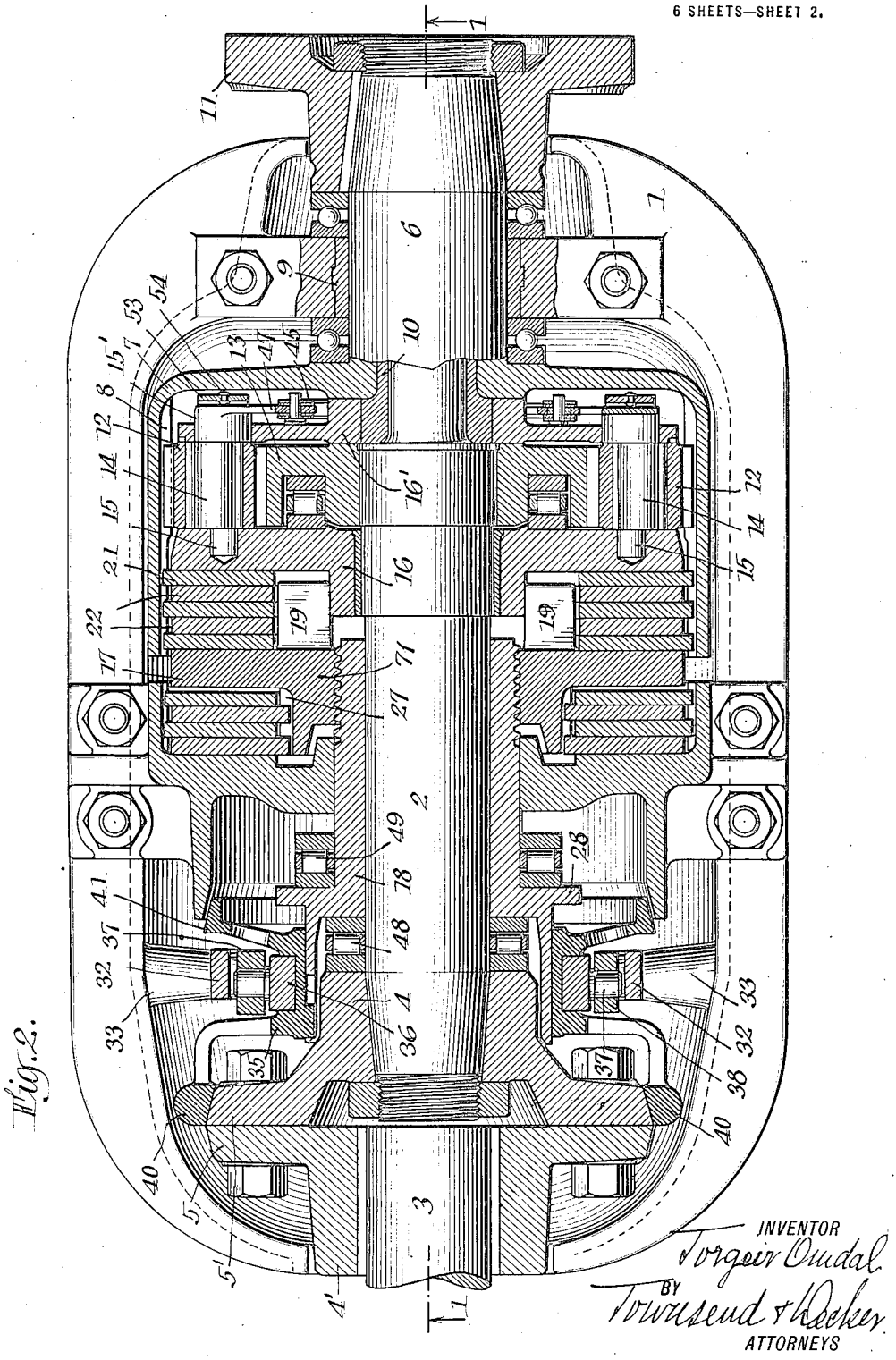
Fig. 2 is a horizontal central section of the same.

Plainly, the compression of the discs upon one another with sufficient force to prevent the turning of them upon one another by friction will result in the interlocking of the members 16 and 7 with relation to one another. A similar friction clutch that may be employed on the other side of the actuator for holding the actuator or member 17 and pinion carrying disc 16 interlocked therewith by the jaws already described, against any turning movement, comprises discs 23 having notches on their outer edges engaged by feathers 24 on the inside of a flange projecting from the stationary member 25 and co-operating friction discs 26 engaged at their inner edge by means of notches with feathers 27 on projections extending longitudinally from the clutch operating member or actuator 17. Stationary member 25 may consist of a plate or casting encircling the drive shaft 2 and screw 18 and may be supported from the edges of the frame or housing 1 as indicated in the plan view Fig. 2. Said plate or casting 25 may also act, as indicated, as an additional support for the screw sleeve 18 and shaft 2.

Plainly, when the member 17 is forced axially against the members 23, 24 to compress the same sufficiently, said member 17 will be practically locked against turning movement and likewise the gear carrying member 16 will be locked owing to the interengagement of the jaws on said members 16 and 17 respectively.

The construction and operation so far described assumes that there is no axial movement of the member 18. For some purposes, however, it is desirable that it should be capable of axial movement in order that it may impart movement to devices to be now described.

Mounted and guided upon the inside of the base is a plate or block 30 adapted to slide or move to and fro upon the inside of the base 1 and suitably actuated by the axial movement of the screw 18 or by other part which moves in the operation of setting or actuating the clutches. Said device 30 serves as an actuating member whereby the controlling lever of the apparatus may be automatically thrown into neutral position when it is desired to uncouple the drive and driven shafts for the purpose of bringing the latter to rest, as will be described. Said device 30 operates on the control lever through a supplemental latch and lever or yoke the arms of which, indicated at 32, are pivotally supported upon the inwardly extending bosses 33 on the base 1. The arms 32 are pivotally connected at their lower ends with upstanding arms 31 rising from the plate 30 and said plate is reciprocated by the screw 18 by the flange 28 which engages a notch in a standard 29 rising from plate 30. This construction is for the purpose of allowing free rotational movement of the screw during its axial movement when it operates to move plate 30 and connected arms 32 interconnected at will by means of a latch with the principal control lever of the apparatus.

To provide for coupling the member 18 to a rotating member whereby it may be rotated to produce the actions described, and to provide likewise for holding it against rotation, suitable cone clutches may be used and may be constructed as follows:

Splined or keyed upon a tubular extension of the screw threaded member 18 so as to be capable of longitudinal movement on the screw is a sleeve 35 adapted to turn within the operating collar 36 sleeved thereon and connected by pins 37 with the arms of the principal control lever 38. The arms of said lever, as shown, may be pivoted upon the bosses 33. In addition, the control lever 38 is provided with a latch 55 which is adapted to be placed in position to engage with the yoke 32 so that the movement of the latter by means of the screw 18 may serve to throw the control lever to neutral position whenever the latch 39 is placed in operating position as will be described later on.

The sleeve 35 carries on one side a member 40 of a cone clutch whereby the screw may be coupled to the drive shaft 2 or other turning member for the purpose of rotating said screw and compressing thereby the members of the friction clutch which lock members 16 and 8 together when it is desired to produce a forward direct drive of shaft 6 from shaft 2 at the same speed as shaft 2. Said cone clutch 40 engages, as shown, a suitable clutch surface which may be upon one of the flanges of the coupling between shafts 2 and 3. Said clutch is engaged by the action of the control lever 38 which moves the free collar 36 carrying with it the sleeve supporting the clutch member 40. When so engaged screw 18 is rotated by the action of the sleeve keyed on the extension thereof as already described.

The clutch supporting sleeve 35 likewise carries the member 41 of another cone clutch, said member 41 being engaged by the reverse movement of the control lever 38 with a cone clutch surface formed on the flange extending from the fixed plate or member 25. Obviously when the members of the latter clutch are engaged, the member 40 of the other clutch is disengaged and by means of clutch 41 the screw 18 will be locked against rotation so that the friction clutch actuating member or nut 17 will be turned on said screw by the operation of the gear carrying disc 16 as already described, and will move in the reverse direction in a manner to compress the members of the friction clutch against the fixed member 25 and thereby eventually lock the member 16 against turning, after which the shaft 2 will drive the shaft 6 with a gear reduction in the reverse or opposite direction to the direct drive by turning the intermediate gears or pinions 12 the support for which is now immovable, so that they operate to transmit power by their turning movement to the internal gear carried by the member 6.

As will be seen the engagement of either clutch 40, 41 will not interfere with a free axial movement of the screw or member 18 when it is desired to utilize such axial movement in the manner hereinafter described. In this movement of shaft 6 by the turning of the gears 12 on their own axes, the power is distributed through the gears but the torque or power is equalized between them as already described by the equalizing link connections 45 between the mountings or supports for said pinions. Said equalizing links are pivoted together and connection is made with them at the pivotal points of connection by arms 47 extending from the pinion mountings. When a pinion mounting turns on its eccentric bearings 15, 15' under increased torque, the arm 47 swings and carries the pivotal connection of adjacent equalizing links to which it is attached outwardly with the effect, through said system of links, of turning the arms of the other pinions in the reverse direction to carry said pinions into position to increase the torque through them.

The effect is, as already described, to produce an equalization of the distribution of torque during the transmission of the power by the turning in concert of said drive pinions or gears through the action of the external gear 13 or other operating device.

As shown in the various figures, ball and roller bearings may be interposed between the operating parts at any desired points, as for instance, in the manner shown to take up the thrust of the driven shaft through the ball bearings applied as indicated at opposite sides of the supporting standard for said driven shaft, roller bearings being interposed also to take up friction between members 16 and 13 when they are turning with reference to one another. They may be also applied between a flange on the member 18 and the fixed plate or support 25 and between the shoulder on the end of the member 18 and the hub of the coupling secured to the end of shaft 2. The latter antifriction bearings take the thrust of the screw at the end of the axial movement thereof permitted or allowed by the clearance provided for that purpose, at which time an axial thrust is produced on member 17 to hold the friction clutches engaged.

Fig. 1 shows the mechanism with the parts in the position assumed during direct drive of the shaft 6 at synchronous speed with the drive shaft 2. In this condition of operation the threaded member 18 is, as shown, at the extreme of its axial movement to the left and the thrust of the screw, in exerting force through the nut 17 to hold the members of the direct drive friction clutch together by the screw action upon the nut, is taken up by the roller bearings 48 interposed between the end of the screw and the hub 4 of shaft 2 acting as an abutment to limit the rearward axial movement of the screw. In this position the members of the clutch engaging rotatable member 16 are held firmly together without slip and member 16, together with the gear wheel 13 and gear 8, rotate together with the shaft 2, and continue so to rotate without any further action of the nut and screw since they continue to rotate at the same speed. Should any slip take place, however, the member 16 carrying the pinions will continue to rotate with the drive shaft 2 but at a less speed since it now acts like the gear supporting member of an epicylic or planetary train and turns around 2 as a center under the action of the pinions now caused to turn on their own axes by the action of the differential gears 13 and 8, the latter of which is relatively fixed. The consequence of this is that the nut will turn at a less speed than the shaft 2 and screw 18, so that the relative turning movement of the screw in the nut (the screw being now in position to be held against axial movement) will cause the nut to move axially and set up the clutch so as to take up the slip and cause the driven shaft to rotate at full speed. This compensating action is also of use in compensating for wear of the members of the clutch upon one another and insures a firm engagement and certain action thereof irrespective of wear.

So long as no slip takes place, however, so that no motion can be communicated to member 16 with relation to the shaft 2 and parts rotating therewith through differential action of the gears 13 and 8 upon the pinions, the driven shaft 6 will rotate at the speed of the shaft 2, and screw 18 and nut 17 will rotate therewith and at the same speed, so that no thrust or compressing action will be exerted by the screw and nut upon members of the clutch beyond that necessary to maintain a sufficient drive connection from drive shaft, through the clutch, to driven shaft 6.

Should it be desired to reverse the drive of shaft 6, control lever 38 is thrown to its other extreme position, thereby engaging the cone clutch 41 with the fixed member 25, the first effect of which is to stop the rotation of the screw 18 with the shaft 2. The member 17 thereby begins to turn with relation to the other member 18 of the screw action, being rotated thereon by the turning movement of the member 16 which at the instant of shift, is coupled up with the drive and driven shafts as already described and rotates with them. The screw 18, however, is free to move axially to the right under the influence of the cooperating screw thread on the member 17, while the member 17 itself moves axially by the reversal of the screw action to the left or in a direction to relieve pressure upon the members of the direct drive clutch. With the increasing slip and final disconnection of the clutches the member 16 moves at a decreasing speed with relation to the shaft 2 by the epicyclic gear action but still exerts a turning action upon the member 17 and produces a further axial movement of the screw 18 until the latter finally reaches the limit of its action to the right, and being prevented from moving further axially, the turning movement of the nut or member 17 thereon results in the positive thrust of the latter axially upon the members of the clutch at the left thereof, whereby said nut and connected member 16 are held against further turning movement. The transmission is now through the turning movement of the gear 13, the drive pinions mounted on the member 16 which is now fixed against turning, and the gear 8 on the driving shaft engaged by the drive pinions. The driven shaft 6 thereby is caused to turn in a reverse direction but at a reduced speed (in the particular construction shown) with relation to the drive shaft, the speed reduction being dependent upon the gear ratio in the transmission through which the action now takes place. The thrust of member 18 under the action of the turning member 17 in this reverse operation of the screw action is taken up by the antifriction rollers 49 interposed between the flange 28 on the screw and the fixed abutment 25.

During the reverse drive there is a torque exerted upon the member 16 tending to turn the same although such turning movement, should it take place, would be, as already described, at a reduced speed with relation to the shaft 2; but the resistance to the torque provided by the friction clutch now in action is ordinarily sufficient to prevent such turning movement. Should, however, slip occur for any reason, the nut 17 will be caused to turn in relation to the screw through the torque exerted by the member 16 and the slip will be immediately taken up by axial movement of the nut to the left. In this manner as in the case of the forward drive, an automatic compensation or self-adjustment is provided for the wear while, moreover, should the load increase in such way as to force a slip by increasing the turning movement or tendency to rotation of the member 16 on itself by torque exerted through the planetary action, the slip will be immediately taken up in the same manner by the increasing of the friction between the members of the clutch.

As will be seen, a space is left between the end of the screw 18 and the hub of the member 16 which serves as a clearance space to allow the to and fro axial movement of the screw.

To change from reverse to forward speed the lever 38 is moved back to disengage the controlling clutch 41, by which member 18 is held against rotation and to re-engage the cone clutch 40 by which said member is caused to rotate with the driving shaft.

The member 18 of the screw action now turns within the nut 17 which, during the reverse drive, was held against rotation, and the nut 17 now begins to progress axially to the right and relieves the pressure upon the clutch for the reverse drive while the screw or member 18 begins to move axially towards the left simultaneously with its turning movement and finally takes the position shown in the drawings. At the beginning of the movement the member 16 is at rest, but as soon as the friction between the members of the fixed clutch is released sufficiently to allow the member 16 to rotate under the epicyclic action of the gears, the member 17 will begin to turn. Inasmuch as its speed of rotation is now the speed of rotation of the member 16 and such rotation is a less speed than the speed of the shaft 2 and screw now rotating therewith, there is still a movement of rotation of the screw with relation to the nut so that the latter will continue to progress axially to the right. When the accompanying axial motion of the screw 18 to the left causes it to encounter the abutment, its axial movement stops and the screw action operates with its full thrust axially upon the nut and brings about a complete clamping of the members of the clutch for direct drive forward. As the members of the clutch tighten up the turning motion of the screw with relation to the nut gradually diminishes and finally stops when the nut has been forced sufficiently far to the right to firmly clamp member 16 to member 7, after which the parts all rotate together in the direction of motion of the drive shaft 2 as already described.

The construction described also permits a setting of the device to cause slip of the drive connections in case the propeller or other load upon the driven shaft encounters some obstacle which would positively lock it against rotation with the result of injuring the propeller and damaging the parts in case the slip could not take place. This may be done for either forward or reverse drive. To set the parts for this operation control lever 38 is merely shifted from the position in which the cone clutch for the time being in use is engaged, back to neutral or intermediate position sufficiently to disengage the cone clutch for the particular drive which is at the time being employed but without engaging the other cone clutch or that employed to produce a drive in the opposite direction. This leaves the members of the friction clutch engaged.

Assuming that a reverse drive of the shaft 6 is taking place, the effect of so shifting the lever 38 is to leave the nut 17 free to rotate. Hence, when the propeller encounters an obstruction tending to produce slip of the fixed or lefthand clutch in a manner already described, the screw will be free to rotate with the nut rotating in the manner already set forth and inasmuch as the screw is not fixed against turning movement with said nut, rotation of the latter will not take up or compensate for the slip. The same slip action is permissible in the case of forward drive and will take place if the shift or control lever 38 is turned to neutral or intermediate position to disengage the cone clutch 40.

The effect of this is to permit rotation of the screw upon the shaft and so that no turning action of the nut with relation to the screw and no consequent axial movement of the nut to take up the slip will occur, but on the contrary the nut will carry the screw around with itself, the screw being now free to turn upon the shaft and hence no take-up of the slip in the manner already set forth will occur.

To disconnect or stop the drive for either direction of drive, it is only necessary to throw the lever 38 to disconnect the cone clutch in action and to bring the opposite cone clutch momentarily into action until the operating nut has been moved back sufficiently to release the members of the friction clutch being used and without, however, moving the nut sufficiently far to bring the clutch for the opposite direction of drive into operation.

As soon as this condition or position is reached the operating or control lever is immediately placed in neutral or central position whereupon the transmission of power stops, both cone clutches being out of action and the clutch operating nut remaining in the neutral position reached thereby at the moment of disconnection of the cone clutch. This operation may be conducted by the operator, the parts being thrown at will at the required time but to make it unnecessary for the operator to watch the operation carefully and to produce an action which is automatic in nature, the supplemental latch or connecting device 55 is brought into operation by sliding the same down upon the control lever into operative position with respect to the yoke 32 as shown in Fig. 7.

As already described, the axial movement of the screw when it co-operates with the nut to set the clutches, is accompanied, through the action of carriage or slide 30 connected with said screw, by a movement of the upper end of the yoke lever which movement I employ by means of the latch 55 to throw the control lever back into neutral position as soon as, through the co-operating action of the screw and nut, said nut has been placed in neutral position to disconnect the power for either forward or backward drive.

Assuming that the parts are being used for forward drive, the action for setting the apparatus in neutral position, or in other words to disconnect the power, would be as follows: In this position of the parts the upper end of the yoke lever and the control lever would occupy the positions substantially as shown in Fig. 7. When it is desired to stop the rotation of the driven shaft, the latch 55 connected to the control lever is lowered to operative position with relation to the yoke lever, as shown, but owing to the position of the notch in the latch, the yoke and latch will not be engaged. When the lever 38 is thrown over, it will carry the latch with it and the cone clutch 41 will be engaged and a reverse axial motion of the screw will ensue to disconnect the drive, as already set forth. As soon as this motion begins, the upper end of the yoke lever will be thrown to the left and finally will engage in the notch of the latch with the effect of throwing the control lever back into the neutral position required for disconnection of both forward and backward drive. When disconnection of the drive is desired during reverse rotation, the top of the yoke lever will be at the other extreme of its arc of movement prepared to interlock with the notch in the latch 55, after the control lever 38 has been thrown from position for reverse drive back to position for momentary engagement of the cone clutch employed for direct drive. A slight movement of the screw to the left thereby ensues, thereby producing a movement of the upper end of the latch engaging yoke to the right, so that the control lever will be thereby caused to assume the neutral position after the nut has been moved to the neutral position and the cooperating screw has moved axially to corresponding position.

The plates or discs 16, 16' are spaced apart by suitable spacing projections 50 extending from or attached to one of said members into engagement with the opposite member. The plates are held together by suitable bolts 51 which are tapped with the projections 50. The heads 52 of the bolts serve to hold in place suitable retaining plates 53 which engage the ends of the eccentrically mounted pintles 14 to hold the same in place, said retaining plates being provided at the point of engagement with the eccentric shafts with anti-friction pins 54 (see Fig. 8) which enter recesses or depressions on the shaft centers.

In the modification shown in Fig. 11, the clutch member or compressing plate 17' is engaged and actuated by a member 71' internally threaded to co-operate as one member of the screw action device with an external screw thread upon a hub 76 which is keyed directly to the driven shaft 6' and carries a plate or disc 66 against which the discs of the friction clutch are compressed for the purpose of coupling the drive and driven shafts. The alternating members of the friction clutch have a splined connection respectively with the inside of a barrel or housing 80 as shown, which is carried by a disc 81 having a hub keyed to the driving shaft 2 and with the hub 76.

In this modification the member 71' of the screw action device is caused to turn with the drive shaft or to be locked against turning, at will, by any suitable means, as for instance by the use of the cone clutches 40, 41 carried by a supporting sleeve 35 having a keyed or splined connection with the member 71', as shown, said sleeve being suitably supported for free rotation independently of the shaft 6' as indicated and being movable axially to engage one or the other cone clutch by means of the operating collar 36. When cone clutch 40 is engaged the member 71' is rotated by connection with the drive shaft thus established and the clutch is tightened by the action thereof on the member 17', so that shafts 2 and 6' will be coupled. When cone clutch 41 is engaged with a stationary co-operating face as already described, the member 71' is held against rotation and the co-operating member of the screw action 76, by its turning movement, will reverse the screw action and relieve the clutch, so that torque will cease to be applied through the friction clutch from shaft 2 to driven shaft 6'.

When the shafts are coupled slippage will be compensated or taken up by a movement of the member 71' of the screw action with relation to member 76 since in that case the turning movement of 76 will slow down while 71' will continue to rotate at the speed of the shaft 2 and will in effect rotate on member 76.

What I claim as my invention is:
1. The combination of a drive shaft, a driven shaft, a clutch for coupling said shafts, a screw action device one member of which operates the clutch to couple the shafts, means for turning the other member of the screw action to set the clutch and means for turning the clutch operating member while the other member is stationary to reverse the screw action and release the clutch.

2. The combination of a drive shaft, a driven shaft, two clutches one for direct drive and the other for reverse drive, a screw action device one member of which operates said clutches, means for turning the other member to set the clutch for direct drive and means for turning said clutch operating member while the other member is stationary to reverse the screw action and thereby release the direct drive clutch and bring the reverse drive clutch into action.

3. The combination of a drive shaft, a driven shaft, a planetary gear, two clutches one for coupling the shafts directly together for direct drive and the other for holding a member of the planetary gear against rotation for reverse drive, a screw action one member of which operates said clutches, means for turning the other member of the screw action to set the clutch for direct drive and means for turning said clutch operating member while the other member is stationary to set the clutch for reverse drive.

4. The combination of a drive shaft, a driven shaft, a planetary gear having a gear carrying member mounted for rotation with respect to said shafts, a clutch for coupling said gear carrying member to the driven shaft, locking means for holding said gear carrying member against rotation, a screw action device one member of which operates either upon said clutch or said locking means, means for turning the other member of said screw action device to operate upon said clutch and produce direct drive of one shaft from the other, and means for locking said screw action member against rotation to cause the other member when turned thereon to operate upon the locking means for the planetary gear member, thereby producing reverse drive.

5. The combination of a drive shaft, a driven shaft, a gear keyed to the drive shaft, a gear connected to the driven shaft, intermediate drive pinions mounted upon a rotatable member rotatable with respect to said shafts, a clutch operating member interlocked with said gear carrying member for rotation therewith but capable of axial movement with respect thereto and operating on axial movement in one direction to couple the gear carrying member and the driven shaft, and on movement in the other direction to release said clutch and operate upon locking devices by which said gear carrying member is held against rotation, a screw action, means for turning one member thereof to act upon the clutch operating member to set the clutch and means for holding said member of the screw action against rotation to cause the clutch operating member to turn thereon by a reverse screw action so as to release the clutch and bring the lock for the gear carrying member into action.

6. In a combined clutch and reversing gear, the combination of a clutch for connecting the drive and driven shafts for forward drive, a clutch for producing reverse drive, a screw and a nut acting on the direct drive clutch on rotation of the screw, and on the reverse drive clutch when the screw is held against rotation and the nut turns thereon, means for rotating the screw and means for holding the screw against rotation.

7. In a combined clutch and reversing gear, the combination of a clutch for connecting the drive and driven shafts for forward drive, a clutch for producing reverse drive and a screw action device having co-operating members consisting of a screw and a nut, one member of which device operates on the direct drive clutch on rotation of the other member and on the other clutch when said other member is held from rotation and said clutch operating member turns.

8. In a combined clutch and reversing gear, the combination of a direct drive friction clutch, a reverse drive friction clutch, an operating screw and nut, means for rotating the screw with the drive shaft to cause the nut to compress the members of one of said clutches, and means for holding said screw against rotation to cause the nut to operate on the other clutch by turning on the screw.

9. In a combined clutch and reversing gear, the combination of a direct drive friction clutch, a reverse drive friction clutch, a screw action device, means for rotating one member thereof with the drive shaft to cause the other member to compress the members of one of said clutches and means for holding said rotatable member against rotation to cause said other member to operate on the other clutch by reverse action of the screw when it turns on said rotatable member.

10. In a combined clutch and reversing gear, the combination of a direct drive friction clutch, a reverse drive friction clutch, an operating screw, a nut axially movable for operation on either clutch, means for rotating the screw with the drive shaft to cause the nut to compress the members of one of said clutches, and means for holding said screw against rotation to cause the nut to operate on the other clutch by turning on the screw.

11. The combination of a drive member, a driven member, a friction clutch, a compression member acting on said clutch, an actuating screw therefor sleeved on the drive shaft and means for connecting the screw to the drive shaft.

12. In a combined clutch and reversing gear, the combination with a drive shaft and driven shaft each carrying a gear wheel fixed thereon, a carrier sleeved on the drive shaft, a series of intermediate drive gears mounted on the carrier, a clutch connecting said carrier and driven shaft together for direct drive, locking means for locking the carrier against rotation for reverse drive, a screw action operating on the clutch by a turning movement of one of its members with respect to the other and upon the locking means by a turning movement of the other member upon the first-named member.

13. The combination of a drive shaft, a driven shaft, a friction clutch for connecting said shafts and an actuating screw and nut for said clutch provided with means for connecting the screw for rotation to the drive shaft, said screw and nut being both mounted for axial movement.

14. In a combined clutch and reversing gear, the combination of a drive shaft having a gear wheel keyed thereto, a driven shaft and gear, a disc loose on the drive shaft, intermediate gears mounted thereon, a screw provided with means for connecting it at will to the drive shaft, a nut on said screw and a friction clutch the members of which are interposed between a face of the nut and a face of the gear carrying disc.

15. In a combined clutch and reversing gear, the combination of a drive shaft and gear, a driven shaft and gear, intermediate gears mounted on a carrier adapted to turn with respect to said shafts or to be locked against movement, a screw action one member of which is provided with means for connecting it at will to the drive shaft or for locking it against rotation therewith and a friction clutch the members of which are interposed between a face of said gear support and a face of the other member of said screw action.

16. In a combined clutch and reversing gear, the combination of a drive shaft and gear wheel thereon, a driven shaft and gear, a carrier loose on the drive shaft, intermediate drive gears mounted thereon a screw, a nut on said screw and two friction clutches, one interposed between one side of the nut and the carrier and the other interposed between the other side of the nut and a fixed support.

17. In a combined clutch and reversing gear, the combination of a drive shaft and gear wheel thereon, a driven shaft and gear, a carrier loose on the drive shaft, intermediate drive gears mounted thereon a screw sleeved on the drive shaft and capable of axial movement thereon, a nut on said screw and two friction clutches engaged by opposite faces of the nut, one clutch engaging with the carrier and the other with a fixed support.

18. In a combined clutch and reversing gear, the combination of a drive shaft and gear wheel thereon, a driven shaft and gear, a carrier loose on the drive shaft, intermediate drive gears mounted thereon, a screw sleeved on the drive shaft and capable of axial movement thereon, means for connecting the screw to said shaft for rotation of said screw, means for holding the screw against rotation, a nut engaging with the screw and two clutches actuated thereby, one for coupling the carrier to the driven shaft when the screw is rotated and the other for holding the carrier against rotation when the screw is stationary and the nut is turned thereon.

19. In a reversing gear, the combination of a clutch actuating nut, a screw, means for holding the screw against rotation and means for rotating the nut from a member of the reversing gear to lock said member against rotation.

20. In a reversing gear, the combination of a clutch actuating device constituting one member of a screw action and operating to set the clutch upon rotation of the other member of said screw action, means for holding said other member against rotation and means for turning the clutch actuating member thereon to release the clutch and bring the reversing gear into action.

21. In a combined clutch and reversing gear, the combination with a rotatable gear support, of a driven member a clutch actuating nut for coupling said support to the driven member, a screw operating the nut, means connecting said rotatable support with the nut to reverse the movement thereof and means engaged by the nut on its reverse movement to lock said support against rotation.

22. A heavy power drive gear comprising a series of power driven drive gears, a driven gear meshed with and common to them and means for equalizing the torque of said drive gears consisting of interconnected mountings for said gears each mounting being adapted to permit the gear to move under the influence of the torque in a direction to diminish the proportion of load transmitted through it.

23. The combination with a driven gear, of a series of drive gears, eccentrically pivoted mountings for said gears and torque equalizing connections interconnecting the same whereby movement of one mounting under the torque will be in a direction to tend to diminish the torque but in an opposite direction to the mountings of the others.

24. A power transmission gear comprising a power operated gear wheel, a series of eccentrically mounted gears disposed circumferentially around the same and driven in common thereby and equalizing connections between said gears for equalizing the torque between them.

25. The combination with a driven gear, of multiple drive gears meshing therewith, eccentrically pivoted mountings for said drive gears, arms extending from said mountings and a system of links connecting said arms whereby a rocking movement of any arm under torque will cause reverse movement of the others.

26. The combination with a drive and driven shaft, of a friction clutch connecting the two, an actuating screw and nut for operating the clutch and means for connecting the screw to the drive shaft to cause the same to rotate therewith and operate the nut and means for holding the screw against rotation to release the clutch.

27. The combination with a drive and driven shaft, of a friction clutch for connecting the two and a screw action device one member of which is provided with means for connecting it to the drive shaft to set the clutch and with means for holding it against rotation to cause the other member to turn on it and release the clutch.

28. The combination with a drive and driven shaft, of a friction clutch for coupling the two, a screw sleeved on the drive shaft, a nut for applying pressure to the members of the clutch, means for connecting and disconnecting the screw from the drive shaft and means for locking said screw against rotation with the shaft whereby the turning of the nut upon said screw may relieve the clutch.

29. In a combined clutch and reversing gear, the combination with a co-operating screw and nut, of clutches actuated by said nut by reverse axial movement of the nut for forward and reverse drive respectively, a control lever setting the parts into action for operation of either clutch as required, and means for automatically throwing said control lever into the neutral position when the nut has progressed to neutral position in freeing or disconnecting one or the other clutch as and for the purpose described.

30. In a combined clutch and reversing gear, the combination of a screw action device and clutches actuated by one member of said device through reverse axial movement thereof for forward and reverse drive respectively, a control lever and means connected with the other and axially movable member of the screw action for automatically throwing said control lever into neutral position when the clutch actuating member reaches neutral position.

31. In a combined clutch and reversing gear, the combination of a control lever, clutches for direct and reverse drive respectively, a screw action whose members co-operate by turning with respect to one another to bring said clutches respectively into operation, one of said members having a free axial movement during both operations, a latch and means operated by the axially movable member for engaging the latch and thereby throwing the control lever into neutral position.

32. In a friction drive, the combination of a drive shaft, a driven shaft, a disc or plate adapted to rotate with the drive shaft and mounted concentrically therewith, a friction clutch, an actuator therefor compressing the members of the clutch between a face of the actuator and a face of said disc and a screw action device one member of which carries said actuator while the other member is provided with means whereby it may be coupled at will to the drive shaft or uncoupled therefrom and held against rotation.

33. In a friction drive, the combination of a drive shaft, a driven shaft, a plate adapted to rotate with the drive shaft and mounted concentrically therewith, a friction clutch, an actuator therefor compressing the members of the clutch between a face of the actuator and a face of said plate and a screw action device one member of which carries said actuator while the other member is provided with means whereby it may be coupled at will to the drive shaft or uncoupled therefrom and held against rotation, said plate and said clutch actuator being interconnected for rotation of the actuator upon the fixed member of the screw action to release the clutch.

34. The combination of a drive shaft, a driven shaft, a clutch for producing direct drive, a clutch for producing reverse drive, a screw action device having complementary members one of which operates on said clutches, means for turning the other member from the drive shaft to set the direct drive clutch and means for turning the clutch operating member on its complementary member from the drive shaft to set the clutch for reverse drive, said latter turning means being mounted and operatively connected with the drive shaft to permit rotation of said shaft after the clutch for the reverse drive is set.

35. The combination with a drive and driven shaft of a clutch, a screw action device operating on the clutch by a turning movement of one member thereof with relation to its complementary member and means for holding the one member stationary to reverse the action and release the clutch by the turning of the complementary member.

36. The combination of a drive shaft and a driven shaft, a clutch for coupling them to one another, a screw action device for operating said clutch, means for connecting one member of the screw action to the drive shaft to cause turning of said member and a setting of the clutch and means for holding said member against turning to permit the other member to turn with relation to it and to release the clutch by a reversal of the screw action.

37. The combination of a drive shaft, a driven shaft, a clutch for connecting the two and a screw action device one member of which is provided with means for connecting it to the other member to cause a setting of the clutch by a screw action and with means for holding it against rotation to permit the other member to turn with relation to it under the action of the power so as to release the clutch by a reversal of the screw action.

38. The combination of a drive shaft, a driven shaft, a clutch for coupling them together, a clutch operating device and means for producing reverse movement of said clutch operating device to couple and uncouple the shafts said means comprising a screw action device one member of which is turned by the action of the power to move the clutch operating device in one direction and is held stationary while the other member is turned with relation to it to move the clutch operating device in the other direction.

39. The combination of a drive shaft, a driven shaft, a friction clutch and a screw action device for holding the friction clutch set, one member of said device being operatively connected with the drive shaft and the other with the driven shaft to compensate for wear or slippage.

Signed at New York, in the county of New York, and State of New York, this 9th day of August A. D. 1918.

TORGEIR OMDAL.

Witnesses:
F. B. TOWNSEND,
F. E. ROESLER.